(12) United States Patent
Yuan

(10) Patent No.: US 12,147,829 B2
(45) Date of Patent: Nov. 19, 2024

(54) DATA PROCESSING SYSTEM AND METHOD FOR HETEROGENEOUS ARCHITECTURE

(71) Applicant: BEIJING ONEFLOW TECHNOLOGY CO., LTD, Beijing (CN)

(72) Inventor: Jinhui Yuan, Beijing (CN)

(73) Assignee: BEIJING ONEFLOW TECHNOLOGY CO., LTD, Beijing (CN)

( * ) Notice: Subject to any disclaimer, the term of this patent is extended or adjusted under 35 U.S.C. 154(b) by 438 days.

(21) Appl. No.: 17/568,632

(22) Filed: Jan. 4, 2022

(65) Prior Publication Data

US 2022/0129302 A1  Apr. 28, 2022

Related U.S. Application Data

(63) Continuation of application No. PCT/CN2020/093842, filed on Jun. 2, 2020.

(30) Foreign Application Priority Data

Jul. 15, 2019 (CN) .................. 201910633614.6

(51) Int. Cl.
*G06F 9/46* (2006.01)
*G06F 9/48* (2006.01)
*G06N 3/04* (2023.01)

(52) U.S. Cl.
CPC ............ *G06F 9/4843* (2013.01); *G06N 3/04* (2013.01)

(58) Field of Classification Search
CPC .............................. G06F 9/4843; G06N 3/04
See application file for complete search history.

(56) References Cited

U.S. PATENT DOCUMENTS 9,390,369 B1    7/2016   Sinyavskiy et al.

FOREIGN PATENT DOCUMENTS

| CN | 108388474 A | 8/2018 |
| CN | 109814986 A | 5/2019 |
| CN | 109918182 A | 6/2019 |
| CN | 110222005 A | 9/2019 |

OTHER PUBLICATIONS

International Search Report of PCT/CN2020/093842.
Written Opinion of PCT/CN2020/093842.

*Primary Examiner* — Gregory A Kessler

(57) ABSTRACT

Provided is a data processing system for a heterogeneous architecture, including, a job decomposing component, configured to decompose a to-be-completed job into a series of tasks executed by an execution subject in the heterogeneous architecture; a task topology generating component, configured to generate a task relationship topology based on an inherent relationship between the decomposed tasks during the job decomposition, where a task node of the task topology includes all node attributes required to execute a corresponding task; an execution subject creating component, configured to create a corresponding execution subject for each task in a computing resource based on the task relationship topology; and an execution subject network component, configured to include one or more data processing paths including various created execution subjects, and fragment actual job data into task data when receiving the actual job data.

20 Claims, 2 Drawing Sheets

DATA PROCESSING SYSTEM AND METHOD FOR HETEROGENEOUS ARCHITECTURE

CROSS-REFERENCE TO RELATED APPLICATIONS

This application is a bypass continuation application of PCT application no.: PCT/CN2021/100364. This application claims priorities from PCT Application No. PCT/CN2021/100364, filed Jun. 16, 2021, and from the Chinese patent application 202110480070.1 filed Apr. 30, 2021, the contents of which are incorporated herein in the entirety by reference.

TECHNICAL FIELD

The present disclosure relates to data processing technologies, and in particular to a data processing system and a data processing method for a heterogeneous architecture.

BACKGROUND

Along with development of machine learning and gradual deepening of the researches on artificial neural networks, the concept of the deep learning draws broad attentions and is widely applied. The deep learning is a special machine learning, which expresses a learned object using a mesh hierarchical structure, combines simple concepts into an abstract concept, and realizes an abstract concept expression using a simple concept computation. Nowadays, the deep learning has gained significant progress in image recognition, voice recognition and natural language processing. Due to many model parameters involved in the deep learning, a huge computation amount will be required. Furthermore, due to a large scale of training data, the deep learning features large consumption of computing resources and the like.

At present, the general processor GPU or the dedicated chip TPU are both many times stronger than the CPU. However, in the actual applications, the desire for computing power is always endless and therefore the practitioners need to process data of larger scale using a model of larger scale at a faster speed, which cannot be achieved using one hardware device alone. The hardware development is limited by manufacturing processes such as chip area, power consumption, and clock signal propagation scope and thus the processing capability of one chip cannot be increased without limitation. In view of this, people usually complete a large-scale task cooperatively by connecting a plurality of high-throughput devices using high speed interconnection technology. In a common GPU cluster architecture, GPUs in a same node (server) communicate with each other via NVLink or PCIe, and a plurality of nodes are interconnected via high speed Ethernet or Infiniband. In a hardware deployment of TPU cloud in Google, each server manages several TPUs and several servers are connected into a large scale cluster through the high speed interconnection technology. Therefore, it is required to find how to enable several interconnected devices to work efficiently, which brings severe challenge to the software development of the deep learning.

For the above purpose, those skilled in the part propose data parallel, which means that data is divided into several pieces, each of which is processed by one device. In this case, each device only needs to process a small portion of entire data, and a running time of a system is reduced from a time in which one device processes all data to a time in which one device processes a small portion of data, thereby achieving acceleration. This is the commonest parallel mode in big data scenarios. For example, four training samples are equally divided into two groups which are allocated to two devices for processing respectively. At this time, two devices hold two copies of the same model. When a deep learning model is trained, forward and backward computations on one device may be performed independently, but an update gradient of the model obtained on each model needs to be synchronized between devices and aggregated to a gradient on a complete data set before model update is performed. The data parallel is specially suitable for scenarios such as convolutional neural network. A model of the convolutional neural network is composed of many small convolutional kernels, thus making the volume of the model small. Therefore, the communication traffic is small when the model gradient is synchronized between devices. At present, all frameworks can support the parallel mode very well, but the data parallel is not applicable in a scenario with a very large model.

In some scenarios, the model is very large such that the data parallel results in very large communication overhead, or the model exceeds the GPU device memory capacity. Therefore, for a scenario with a very large model, those skilled in the part propose model parallel. In this case, a model is to be cut and each device only needs to complete computation corresponding to a portion of model, which is called model parallel. Somebody ever proposed that the data parallel or the model parallel may be automatically selected according to a size of transmission data during paralleling or a size of communication traffic of a transmission model. In the model parallel mode, usually, one GPU is in charge of computations of one part of output neurons and another GPU is in charge of computations of the other part of output neurons, which is equivalent to that a matrix is fragmented and each device only completes one portion of computations. Therefore, during model paralleling, it is not required to synchronize model between devices but synchronize data between devices. Most of the existing open-sourced frameworks render no support or weak support to the model parallel. Therefore, high efficiency execution can be achieved only with subtle adjustment. The model parallel is a widely-recognized difficulty in the industry, but people still continue their exploration arduously.

In addition to the complexity of the model parallel itself, the synergy of the model parallel mode with other parallel modes is also very complex. Thus, care should be taken to manage data transmission (routing) between upstream and downstream. Taking two adjacent layers of neural network as an example, a first layer uses data parallel and a second layer uses model parallel. In this case, during a forward computation, it is required to summarize a result of the data parallel to two devices of the model parallel through two layers of routings, Copy and Concat (a method of connecting two or more arrays). If the back and front layers are executed on different machines, an inter-machine communication is further required. If these complex data routings require manual management of users, it will, on one hand, be very complex (imagine various combination modes of the data parallel and the model parallel) and on the other hand, easily generate errors. In an ideal situation, these complexities should be processed by a deep learning architecture. However, it is a pity that the existing open-sourced deep learning architectures do not support the function.

Although the above parallel processing manners increase the data processing rate, the speed of moving the data between the devices is not significantly increased compared with a traditional CPU cluster. For example, in-machine communication is completed via PCIe. Even if the machines are interconnected via the fastest infiniband, the bandwidth is still one or two orders of magnitude slower than a bandwidth in which the GPU core accesses a device memory. A time in which a small batch of data is processed on the GPU device may be several dozens of milliseconds while it may also take about this order of magnitude of time to copy the batch of data to the device from outside of the device. It means that data movement must be given sufficient attention in improving architecture processing efficiency in a distributed deep learning architecture. Therefore, maintaining movement of a small batch of data on GPU as possible will greatly reduce the overhead of the data communication between the device end and the outside.

Finally, the high throughput computation of the GPU requires data used for computation (input data or model) to be firstly moved to the device memory, the capacity of which is far smaller than a host memory. Therefore, when a large-scale model (for example, a capacity of a model or intermediate data generated by computation exceeds the device memory) is processed by training a deep learning model using a GPU cluster, a new problem is brought for how to best utilize limited resources. For example, when an input of one neuron comes from an output of a neuron on another training unit, communication overhead will be generated. In most cases, the communication overhead and synchronization consumption of the model parallel exceed the data parallel computation. Therefore, the acceleration is inferior to the data parallel. Furthermore, hybrid parallel is an optimized solution, in which model paralleling is adopted on a same machine (model cutting between GPUs) and data paralleling is adopted between machines. However, in the hybrid parallel, model parameters for the computation of each GPU need to be interacted, resulting in an interaction overhead of very high order of magnitude. Thus, the learning efficiency of the model is severely affected.

Therefore, from the perspective of technical approaches of data parallel, model parallel and hybrid parallel proposed in the prior art at present, most researchers and users of dedicated AI chips usually focus only on power consumption and efficiency of the computation, i.e. on how to design an AI chip to allow it to execute matrix operation more efficiently, thus focus less on requirements of data movement, and data forwarding and routing. However, when a large-scale task is performed cooperatively based on multiple chips, both the power consumption and the delay of the data movement are very obvious. As the GPU device and the CPU become more and more excellent in performance, data scheduling between actors already becomes a big factor limiting the efficiency of the deep learning. Therefore, it is urgent to solve the problem of how to reduce the overhead of data scheduling between various GPS or between the GPU device and the CPU in the deep learning field.

Hence, people desire to obtain a data processing system for a heterogeneous architecture, which is capable of eliminating one or more technical problems of the above prior arts, increasing a training speed of a neural network and reducing a difficulty for technicians to process data by using such architecture.

SUMMARY

The object of the present disclosure is to provide a solution for solving at least one of the above technical problems, specifically, provide a solution in which job data movement and processing are equally emphasized in a system and data movement and routing are implemented by a dedicated actor, so as to improve the data movement efficiency of the entire system.

According to one aspect of the present disclosure, provided is a data processing system for a heterogeneous architecture. The data processing system includes: a task topology generating component, configured to decompose a to-be-completed job into a series of tasks executed by an actor in the heterogeneous architecture, and generate a task relationship topology based on an inherent relationship between the decomposed tasks during the job decomposition, wherein a task node of the task topology includes all node attributes required to execute a corresponding task; an actor creating component, configured to create a corresponding actor for each task in a computing resource based on the task relationship topology; and an actor network component, configured to include one or more data processing paths including various created actors, and fragment actual job data into task data when receiving the actual job data, wherein the task data is continuously input into the data processing path so as to complete the processing of the task data.

The data processing system for a heterogeneous architecture according to the present disclosure further includes a job describing component, configured to describe a job neural network model and a resource to be applied for by the job based on a job type.

In the data processing system for a heterogeneous architecture according to the present disclosure, the job describing component is configured to describe the job from different dimensions which are orthogonal to each other in a mutual distinguishing separation manner.

In the data processing system for a heterogeneous architecture according to the present disclosure, the heterogeneous architecture includes one or more central processing units and at least one coprocessor device end connected with the one or more central processing units.

In the data processing system for a heterogeneous architecture according to the present disclosure, the heterogeneous architecture further includes a gateway connected between a plurality of central processing units.

In the data processing system for a heterogeneous architecture according to the present disclosure, the node of the task topology includes all node attributes required to execute a corresponding task.

In the data processing system for a heterogeneous architecture according to the present disclosure, the all node attributes include a resource attribute indicating a resource required by a task corresponding to a node and a condition attribute indicating a condition of triggering a task execution.

In the data processing system for a heterogeneous architecture according to the present disclosure, the task topology generating component includes one or combination of a redundant node eliminating unit and a blocked node eliminating unit.

In the data processing system for a heterogeneous architecture according to the present disclosure, each of the data processing paths includes one or more upstream actors and one or more downstream actors, wherein each downstream actor receives processed task data output by the upstream actor.

In the data processing system for a heterogeneous architecture according to the present disclosure, the actor includes a finite state machine and a processing component, and the processing component executes a task designated during creation every time the finite state machine satisfies a predetermined condition.

In the data processing system for a heterogeneous architecture according to the present disclosure, the actor includes a message bin, and receives a message of the upstream or downstream actor through the message bin, so as to obtain task data generated by the upstream actor based on the message from the upstream actor and idle a local memory based on the message from the downstream actor.

In the data processing system for a heterogeneous architecture according to the present disclosure, the actor is a movement actor or a computing actor.

According to another aspect of the present disclosure, provided is a data processing method for a heterogeneous architecture. The data processing method includes: a job decomposition step, in which a to-be-completed job is decomposed into a series of tasks executed by an actor in the heterogeneous architecture; a task relationship topology generation step, in which a task relationship topology is generated based on an inherent relationship between the decomposed tasks during the job decomposition performed in the job decomposition step, wherein a task node of the task topology includes all node attributes required to execute a corresponding task; an actor creation step, in which a corresponding actor is created for each task in a computing resource based on the task relationship topology; and a task data processing step, in which actual job data is fragmented into task data when the actual job data is received, wherein the task data is input continuously into one or more data processing paths including various created actors so as to complete the processing of the task data.

The data processing method for a heterogeneous architecture according to the present disclosure further includes a job description step, in which before the job decomposition step is performed, a job neural network model, a number of neural network layers and a number of neurons in each neural network layer are described based on a job type.

In the data processing method for a heterogeneous architecture according to the present disclosure, the job is described from different dimensions which are orthogonal to each other in a mutual distinguishing separation manner in the job description step.

In the data processing method for a heterogeneous architecture according to the present disclosure, the heterogeneous architecture at least includes a central processing unit and a coprocessor device end connected with the central processing unit.

In the data processing method for a heterogeneous architecture according to the present disclosure, the heterogeneous architecture further includes a gateway between a plurality of central processing units.

In the data processing method for a heterogeneous architecture according to the present disclosure, the task relationship topology generation step includes assigning all node attributes required to execute a corresponding task to each node.

In the data processing method for a heterogeneous architecture according to the present disclosure, the all node attributes include a resource attribute indicating a resource required by a task corresponding to a node and a condition attribute indicating a condition of triggering a task execution.

In the data processing method for a heterogeneous architecture according to the present disclosure, the task relationship topology generation step comprises a step of eliminating a redundant node or a blocked node during the generation of the task relationship topology.

In the data processing method for a heterogeneous architecture according to the present disclosure, each of the data processing paths includes one or more upstream actors and one or more downstream actors, and each downstream actor receives processed task data output by the upstream actor.

In the data processing method for a heterogeneous architecture according to the present disclosure, the actor includes a finite state machine and a processing component, and the processing component always executes a continuously-input task designated during creation every time the finite state machine satisfies a predetermined condition.

In the data processing method for a heterogeneous architecture according to the present disclosure, the actor includes a message bin, and receives a message of the upstream or downstream actor through the message bin, so as to obtain task data generated by the upstream actor based on the message from the upstream actor and idle a local memory based on the message from the downstream actor.

In the data processing system for a heterogeneous architecture according to the present disclosure, the system, on one hand, automatically allocates the tasks to specific actors, which eliminates consideration required to be made to data scheduling during a programming process in a conventional system, and thus significantly reduces workload of programmers and simplifies program codes, such that the programmers can achieve purposes by use of simple logic relationship, thus indirectly reducing risk of program errors and improving the working efficiency of the programmers; on the other hand, because the stated tasks are pre-assigned to predetermined actors, the actors only need to carry out execution immediately upon obtaining to-be-processed task data during an execution process, without being subjected to any scheduling process, where the to-be-processed task data comes from the upstream actor. In this way, the data transfer will be easier and faster, thus increasing high utilization rate of the actors. In addition, since the adopted actors are appointed actors, there will no actors which are in a completely idle state. Those actors un-appointed in the heterogeneous architecture may be used for other purposes in a running process of the data processing system.

One part of other advantages, objects and features of the present disclosure will be described below and the other part thereof will be understood by those skilled in the art through understanding and practice of the present disclosure.

BRIEF DESCRIPTIONS OF THE DRAWINGS

DETAILED DESCRIPTIONS OF EMBODIMENTS

Figure 1:
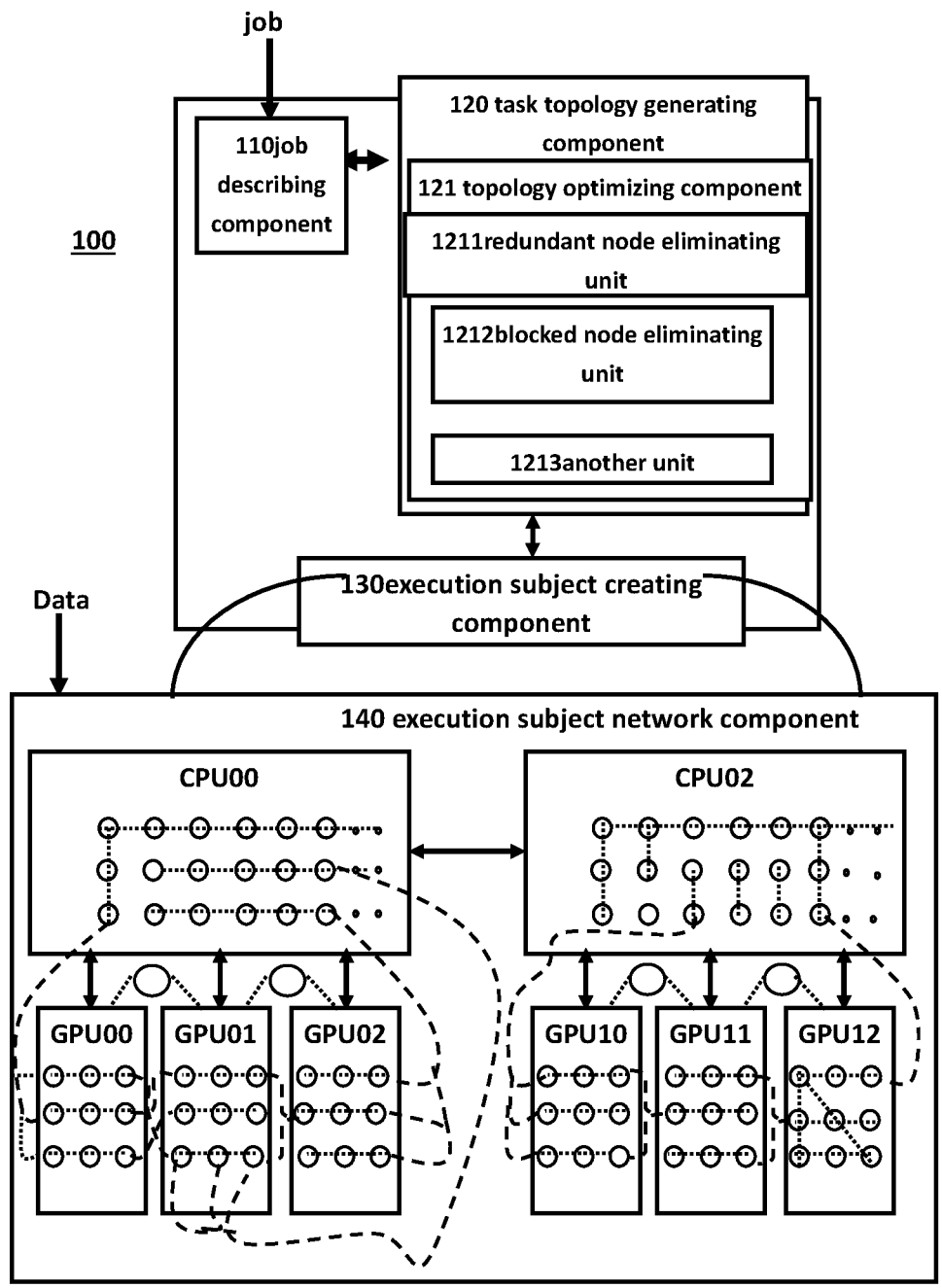
FIG. 1 is a structural schematic diagram illustrating a data processing system for a heterogeneous architecture according to one or more embodiments of the present disclosure.

The present disclosure will be further detailed below in combination with the embodiments and accompanying drawings so as to enable those skilled in the art to carry out the present disclosure based on the specification.

Exemplary embodiments will be described in detail herein, with the illustrations thereof represented in the drawings. When the following descriptions involve the drawings, like numerals in different drawings, refer to like or similar elements unless otherwise indicated. The implementations described in the following exemplary embodiments do not represent all implementations consistent with the present application. Rather, they are merely examples of apparatuses and methods consistent with some aspects of the present application as described in detail in appended claims.

The terms used herein are used for the purpose of describing a particular embodiment only rather than limiting the present disclosure. The terms such as "a", 'said", and "the" of their singular forms used in the present disclosure and the appended claims are also intended to include multiple, unless the context clearly indicates otherwise. It is also to be understood that the term "and/or" as used herein refers to and includes any or all possible combinations of one or more associated listed items.

It is to be understood that, although the terms "first," "second," "third," and the like may be used in the present disclosure to describe various information, such information should not be limited to these terms. These terms are only used to distinguish information of same category from each other. For example, without departing from the scope of the present disclosure, one of two possible devices hereafter may be referred as first actor or second actor; and similarly, the other one of the two possible devices may also be referred as second actor or first actor. Depending on the context, the term "if" as used herein may be interpreted as "when" or "upon" or "in response to determining".

In order to enable those skilled in the art to understand the present disclosure better, the present disclosure will be further detailed in combination with accompanying drawings and specific embodiments.

FIG. 1 is a structural schematic diagram illustrating a data processing system 100 for a heterogeneous architecture according to the present disclosure. As shown in FIG. 1, the heterogeneous architecture includes CPU00, CPU01, GPU00, GPU01, GPU2, GPU10, GPU11 and GPU12, where the GPU00, GPU01 and GPU2 are connected with the CPU00 respectively, and GPU10, GPU11 and GPU12 are connected with the CPU01 respectively. Although only two CPUs and six GPUs are shown herein, the heterogeneous architecture may include more CPUs, and more or less GPUs may be connected with each CPU, which may be determined based on actual requirements. Although the present disclosure is described only with GPUs herein, the present disclosure may also be applicable to other coprocessors, such as accelerator APU, BPU and DPU.

The data processing system 100 according to the present disclosure is deployed in the heterogeneous architecture shown in FIG. 1. The components of the data processing system in FIG. 1 are separately illustrated outside the CPUs and GPUs to highlight the illustration and facilitate description. Actually, the components of the data processing system are all distributed among the CPUs and/or GPUs.

As shown in FIG. 1, the data processing system 100 includes a task topology generating component 120, an actor creating component 130 and an actor network component 140.

As shown in FIG. 1, the task topology generating component 120 is configured to decompose a to-be-completed job into a series of tasks executed by an actor in the heterogeneous architecture, and generate a task relationship topology based on an inherent relationship between the decomposed tasks during the job decomposition. The data processing system 100 is disposed for the purpose of processing job data of predetermined type. In order to perform continuous processing for data of same type, it is required to decompose the job into simple tasks suitable for operations or the like of an operation unit of the CPU or the GPU. Specifically, the job is decomposed into mutually-associated tasks. The decomposition of the task topology generating component 120 for the job includes decomposition of data block and decomposition of data processing model, that is, the job decomposition is to set a decomposition manner for to-be-processed job data. Specifically, based on the descriptions of job task requirements in a to-be-processed process, the job is hierarchically decomposed into a multilayer neural network structure. One job is decomposed into a series of mutually-dependent tasks, and such dependence relationship is usually described using a directed acyclic graph (DAG), where each node represents one task and a line connecting two nodes represents one data dependence relationship (producer and consumer relationship). The specific details of the task relationship diagram after the job decomposition will not be specifically described herein.

During gradual job decomposition, the task topology generating component 120 generates a task relationship topology layer by layer. Since there is an inherent logic relationship among various tasks into which the job is decomposed, the task topology generating component 120 generates the task relationship topology on different task layers along with decomposition of the job into different tasks. These task relationship topologies form a neural network among the decomposed tasks. In a case of a complex job, the task relationship topology includes multiple layers and thus a multilayer task neural network is also formed. Each layer of neural network includes both a neuron node corresponding to a specific task and a relationship between various neurons. Further, each layer of neural network includes a data parallel network to be used for a task of data fragmentation in the future and a model parallel network to be used for a task of model fragmentation. Optionally, these neural networks may only include the data parallel network. Whether to include the data parallel network and the model parallel network at the same time may be determined based on actual requirements.

In order to enable the actor creating component to create an actor for any node of the task topology at one time subsequently, the task topology generating component 120 in the present disclosure assigns all node attributes required to execute a corresponding task to each node while generating each node of the task topology. The all node attributes include a resource attribute indicating a resource required by a task corresponding to a node, and a condition attribute indicating a condition of triggering a task execution and the like. Because each node of the task topology of the present disclosure includes all node attributes, the node will have all resources and all attributes for task execution immediately upon subsequent creation of an actor and is in a fully configured state and no longer needs to perform dynamic allocation for environment resource or the like and perform dynamic configuration for the trigger condition and the like when performing specific task for specific data. For each actor created based on the task topology of the present disclosure and the node including all node attributes, the each actor itself is in static state except for changing input data during a process of processing specific data. The node of the neural network of the existing data processing system for deep learning includes few or no node attributes. Therefore, during a corresponding task execution, the node needs to temporarily derive the desired attributes in a specific task execution so as to dynamically obtain corresponding resource for completion of the corresponding task. The attributes temporarily derived are to be derived temporarily each time for the same task, thus leading to huge operation overhead.

It is to be pointed out that the task topology generating component 120 needs to optimize the already-formed task relationship topologies while forming the task relationship topology layer by layer. Therefore, the task topology generating component 120 according to the present disclosure further includes a topology optimizing component 121. The topology optimizing component 121 includes various optimizing units, for example, equivalent sub-graph transforming units such as a redundant node eliminating unit 1211 and a blocked node eliminating unit 1212, and another unit 1213 for optimizing topology. Although the above three units are shown in the FIG. 1 of the present disclosure, it does not mean that the present disclosure only includes or necessarily includes these units. The implementation of the present disclosure does not necessarily require inclusion of the above topology optimizing component 121. With the presence of the topology optimizing component 121, the task topology generated by the task topology generating component 120 is more reasonable, and the subsequent data processing will be more smoothly run with a higher processing efficiency.

Specifically, there may be a case that the task topology generating component 120 needs to repeatedly generate a corresponding node for a task during a generation process of the task topology. For example, in a neural network sub-graph, there may be two parallel nodes which have same upstream node and same downstream node and correspond to a same task. These nodes are redundant nodes. Such redundant nodes may repeatedly consume operational resources in the heterogeneous architecture, thereby complicating the neural network. Therefore, these redundant nodes are to be eliminated. If the repetitive node is found in the process of generating the task topology by the task topology generating component 120, the redundant node eliminating unit 1211 will know the presence of the node and directly delete the redundant node, such that the upstream and downstream nodes of the redundant node are only associated to the upstream and downstream nodes of a node (a node performing the same task as the redundant node) same as the deleted redundant node. Furthermore, during a process of generating the task topology by the task topology generating component 120, there may be a case that an interaction between some tasks results in blocking of downstream nodes due to untimely processing of the task, thereby transferring the blocking of the blocked node forward. In view of this, if the blocked node is found during a process of generating the task topology by the task topology generating component 120, the blocked node eliminating unit 1212 will eliminate a node leading to operational blocking in the task topology. Specifically, a connection edge between the blocked node and the upstream node is changed and one or more nodes are added to eliminate the transfer of the blocking of the blocked node to the upstream. Only two topology optimizing units are illustrated herein, but the present disclosure may include more topology optimizing units which will not be described one by one herein. Further, during a process of generating the task topology by the task topology generating component 120, there may be a case that network sub-graphs generated for some associated tasks are complex or of low efficiency. In order to obtain a task topology of higher efficiency, the task topology generating component 120 may generate a plurality of network sub-graphs for some associated tasks. Thus, it is required to make equivalent transformation for various sub-graphs in the topology optimizing component 121, so as to select a sub-graph network with the highest operation efficiency from a plurality of sub-graph networks capable of completing same operation function to replace a current sub-graph network. Although various optimizing units of the above topology optimizing component 121 are described, the above topology optimizing component 121 may also include any other unit, for example, another unit 1213 shown in FIG. 1.

After the task topology generating component 120 generates a task topology for each layer of neural network, the actor creating component 130 creates a corresponding actor for each task based on the task relationship topology in a computing resource included in the heterogeneous architecture. Specifically, corresponding number of operation units and corresponding storage units are specified for each task in the heterogeneous architecture to constitute an actor to execute the corresponding task, based on all node attributes of each node according to hardware resources desired in the task description. The created actor includes various resources in the computing resource of the heterogeneous architecture, such as storage unit, message sending or receiving unit, operation unit and the like. The actor may include one or more operation units as long as it can complete the specified task. After being created, the actor will always execute the specified task invariably unless the task to be executed disappears, for example, the heterogeneous architecture to which the actor belongs is applied again to processing of other types of jobs. A network relationship formed among the created actors correspond to a relationship among various neural network nodes in the task topology so as to form the actor network component 140 shown in FIG. 1. The actors forming the actor network component 140 are distributed in one or more CPUs and coprocessors such as GPU and TPU connected with the CPUs, where the CPUs and the coprocessors all form the heterogeneous architecture. As shown in FIG. 1, the actors of the actor network component 140 are indicated by tiny circles. Some tiny circles are series-connected through dotted line to form a data processing path. One data processing path may have some branches. Two or more data processing paths may be intersected with each other to form one more complex data processing path. These data processing paths will remain unchanged in the heterogeneous architecture.

When receiving actual job data, the actor network component 140 may fragment the actual job data into task data which is then continuously input into the data processing path to complete the processing of the task data. Specifically, the same type of data fragmentations in the continuously input data will be fixedly input into a same data processing path. Like flowing water, the input data fragmentations flow into a data ingress of the same data processing path sequentially, and the processed data will automatically be sent to a next downstream actor in the data processing path until the data flows through the entire data processing path. Therefore, no intermediate scheduling is required in the data processing procedure, and hyper-parameters desired in the data processing procedure will be automatically obtained by a pre-established upstream-downstream relationship in the data processing path. In an existing deep learning system, there is usually one centralized scheduler in charge of monitoring the progress of the entire job and the resource use of the entire system. Firstly, a node with no input data dependence or input data being ready is selected from the DAG and allocated to one working machine with sufficient resources. When one working machine completes one task, the working machine will notify the scheduler. The scheduler may delete the node performing successful execution from the DAG, and then select one node with all input data being ready and then allocate the node to a working machine for execution. In the existing deep learning system adopting a centralized scheduler, high communication overhead will, on one hand, be generated between the scheduler and the working machine, and, on the other hand, a granularity of the tasks into which the job is decomposed is very small. Data transmission and computation on GPU both are usually carried out at the level of dozens of milliseconds. In a case that the entire architecture includes dozens of CPUs or several hundreds of GPU external devices, there will be one task started or ended in each millisecond in the entire system. In this case, there is a need for a scheduler to make a decision. When the scheduler makes a decision, the state of the entire system is significantly changed. Therefore, each decision result will be different, and thus a different working machine will be formed for a same task. In the above data processing system of the present disclosure, each actor is already created and fixed when specifically performing a task. Therefore, no centralized scheduler is required. Each actor does not need to know all information of the entire data processing system for execution of a task, but communicate with local upstream and downstream actors relating to the each actor itself, resulting in no additional communication overhead. State information can be updated in the first time, and each actor can respond in time to change of state, and execute the corresponding task in the first time.

Figure 2:
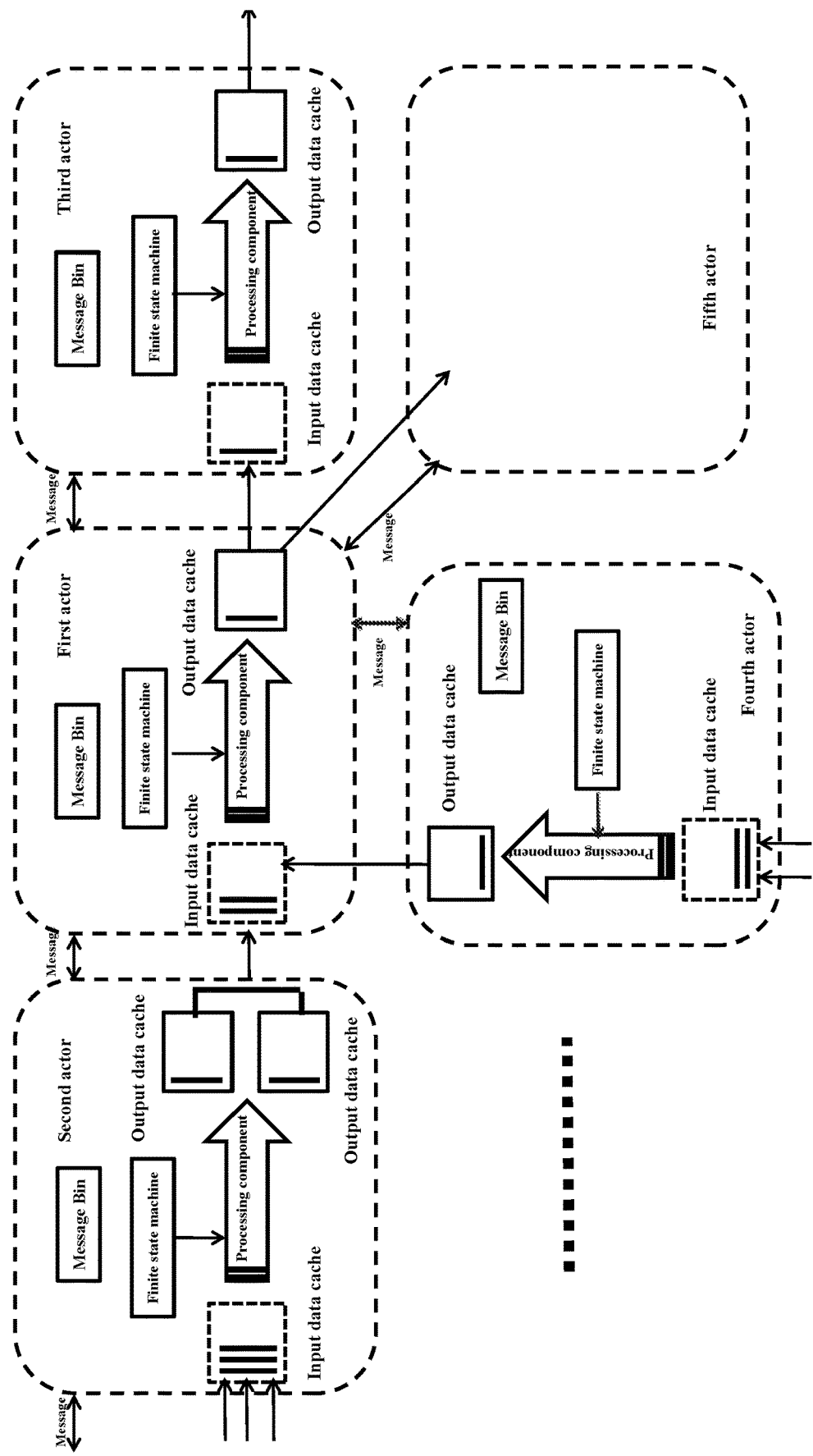
FIG. 2 is a structural schematic diagram illustrating an actor network component in a data processing system for a heterogeneous architecture according to one or more embodiments of the present disclosure.

FIG. 2 is a schematic diagram illustrating a principle of an actor network component 140 of a data processing system according to the present disclosure. As shown in FIG. 2, the large dotted line box indicates one actor. In the actor network component 140 herein, only five actors are shown for ease of illustrations. Actually, corresponding to the task topology, the actor network component 140 has a number of actors equal to a number of task nodes existing in the neural network. Therefore, continuous solid squares are used at the lower left corner of the FIG. 2 to represent other actors not shown. FIG. 2 shows the composition of each actor of the present disclosure on principle, including a message bin, a finite state machine, a processing component, and an output data cache (i.e. local memory). As shown in FIG. 2, each actor seemingly includes one input data cache which is marked with dotted line. Actually, it is an imaginary component which will be explained in details. Each actor in the data processing path, for example, a first actor shown in FIG. 2, is created based on one node in the neural network of the task topology, and a topological relationship between the first actor and its upstream and downstream actors, a message bin, a finite state machine, a processing manner (processing component), and a data-generating cache position (output data cache) are formed based on full node attributes. Specifically, when performing data processing, the first actor, for example, needs two pieces of input data for its task, i.e. the output data of a second actor and a fourth actor at its upstream. When the second actor generates data, for example, second data, to be output to the first actor, the second actor will send a message that data is prepared to the message bin of the first actor, notifying the first actor that the second data is already in the output data cache of the second actor and in an available state, such that the first actor can read the second data at any time, where the second data is always in a state to wait for being read by the first actor. After the message bin obtains the message of the second actor, the finite state machine of the first actor modifies its state. Likewise, when the fourth actor generates data, for example, fourth data, to be output to the first actor, the fourth actor will send a message that data is prepared to the message bin of the first actor, notifying the first actor that the fourth data is already in the output data cache of the fourth actor and in an available state, such that the first actor can read the fourth data at any time where the fourth data is always in a state to wait for being read by the first actor. After the message bin obtains the message of the fourth actor, the finite state machine of the first actor modifies its state. Similarly, if data, for example, first data, is generated by the processing component of the first actor after performing a previous operation task, the first data is cached in its output data cache, and a message that the first data may be read is sent to the downstream actors of the first actor, for example, a third actor and a fifth actor.

When the third actor and the fifth actor read the first data and complete its use, the third actor and the fifth actor may feed a message back to the first actor, notifying the first actor that the use of the first data is completed. Therefore, the output data cache of the first actor is in an idle state. At this time, the finite state machine of the first actor will also modify its state.

In this case, when a state change of the finite state machine reaches a predetermined state, for example, input data (for example, the second data and the fourth data) required by the first actor to perform operation are both in an available state and the output data cache of the first actor is in an idle state, the processing component may be notified to read the second data in the output data cache of the second actor and the fourth data in the output data cache of the fourth actor and perform a specified operation task, so as to generate the output data of the actor, for example, the new first data, and store it in the output data cache of the first actor.

After the first actor completes the specified operation task, the finite state machine will return to its original state to await a next state change cycle, and at the same time, the first actor feeds a message that the use of the second data is completed back to the message bin of the second actor and a message that the use of the fourth data is completed back to the message bin of the fourth actor, and sends a message that the first data is already generated to its downstream actors, for example, the third actor and the fifth actor, to notify the third actor and the fifth actor that the first data is already in a readable state.

After the second actor obtains a message that the first actor completes the use of the second data, the output data cache of the second actor is enabled to be in an idle state; likewise, after the fourth actor obtains a message that the first actor completes the use of the fourth data, the output data cache of the fourth actor is enabled to be in an idle state.

The above process in which the first actor performs a task may also occur to other actors. Therefore, under the control of the finite state machine in each actor, tasks of same category can be processed cyclically based on the output results of the upstream actors. Thus, various actors can achieve pipeline data processing like regular staff with fixed tasks on one data processing path, without needing any external instructions.

Furthermore, although only one output data cache of the actor is described by referring to the FIG. 2, each actor may also have two output data caches like the second actor as shown in FIG. 2 in order to increase the processing efficiency of the entire data processing system. The resource attribute included in the all node attributes of each node to indicate a resource desired by a task corresponding to the node may include two or more output data cache resources, such that each created actor will include two output data caches. When each actor has two output data caches, for example, the second actor has two output data caches as shown in FIG. 2, the two output data caches may be named as a first output data cache, and a second output data cache respectively. In this case, the first actor has to use the output data stored in the first output data cache and the second output data cache alternately. When the second actor has not obtained a message that the first actor completes the use of the second data in the first output data cache, a state identifier of the finite state machine of the second actor indicates its second output data cache is still in an idle state. In this case, the second actor will continue performing corresponding task and cache another piece of generated second data to the second output data cache. Thus, when the first actor executes the second data in the first and second output data caches, the first actor can also execute corresponding tasks at the same time. In this case, due to two output data caches configured, the second actor can perform operation while the first actor performs operation, thus eliminating the waiting time of the first actor, increasing the utilization rate of the actors in the entire data processing path and improving the data processing efficiency of the entire data processing path. Usually, each of all actors is assigned two output data caches or assigned only one output data cache. In some cases, the system may perform separate processing based on actual situations, for example, some actors may be assigned two output data caches respectively and some actors may be assigned one output data cache respectively. In this way, resource saving can be maximized.

As a result, compared with the existing deep learning system, an actor can be created on a specific device based on the tasks on the entire neural network nodes and all node attributes, and will not be used to execute other tasks in the present disclosure. In the existing deep learning system, a policy of dynamically creating an execution unit is adopted, that is, a particular task is not bound to a specific machine or device for execution but executed on the most suitable machine or device selected depending on comprehensive consideration made by the scheduler for load balancing and local environment during task assignment. As shown above, the data processing system of the present disclosure pre-binds an actor to a task. Thus, on one hand, it helps to perform multiple iterative computations of deep learning repeatedly, and significantly reduce some initialization work (for example, resource allocation) to be carried out for each change of devices before task start and some cleaning work to be carried out upon task ending, due to unfixed relationship between the task execution devices in the conventional deep learning system adopting a centralized scheduling process. In this way, the overhead of resource management on the heterogeneous device (for example, applying for or idling the device memory) is reduced obviously. On the other hand, because the deep learning has the features of computational intensity and communication intensity at the same time, a fixed data processing path has been formed between the actors of the data processing system of the present disclosure. As a result, each actor already knows based on its environmental relationship that what is the source of the data to be processed and what is the destination of the processed data, thereby enabling the data processing to be fully in a pipeline state.

Furthermore, in the data processing system of the present disclosure, since an actor is always bound to a task, a resource desired by the task execution, especially a memory desired by the task execution, for example, an output data cache, a message bin and a finite state machine and the like mentioned later, is a part of the actor. Thus, fixing a resource and its size desired by the task execution in an actor will, on one hand, reduce resource management overhead, and on the other hand, improve the system stability and reduce out-of-memory risk in advance.

As shown in FIG. 2, each actor includes one input data cache and actually it is not present because each actor does not need any cache to store data to be used but obtains data in a readable state. Therefore, the data to be used by each actor is still stored in the output data cache of its upstream actor when the actor is not in a specific execution state. For visual display, the input data cache in each actor is indicated by dotted line but it is not actually present in the actor. In other words, the output data cache of the upstream actor is a virtual input data cache of the downstream actor. As a result, in FIG. 2, the input data cache is marked with dotted line. Although the above descriptions are made to the basic composition of the actor and an operation relationship of upstream and downstream actors by referring to FIG. 2, the processing components of some actors possibly do not execute actual operation at all but move only the data to change the position of the data, and therefore they are simple movement actors. For example, the processing component of the second actor may store data obtained from the upstream actor in its output data cache as the second data rather than perform any transformation for the data obtained from its upstream actor. The presence of such movement actor eliminates the upstream blocking of the entire data processing path resulting from the transfer of the blocking of some actors to upstream and the processing pause of other branch paths. Furthermore, the actor of the present disclosure may also be a modification actor which can change its frequency of performing a predetermined task in a predetermined state and the like.

With continuous reference to FIG. 1, the data processing system for a heterogeneous architecture according to the present disclosure may further include a job describing component 110 which is configured to describe a job neural network model, a number of neural network layers, and a number of neurons of each layer of neural network based on job type. Specifically, the job describing component 110 describes an operational resource required by the job and what operation is to be executed. For example, the job description is used to indicate whether the job is used for image classification or a voice recognition classification, a desired number of neural network layers, a number of nodes of each layer, relationship between layers and a storage location of input data during execution procedure of a data processing. The job description is a prior art. The job processing component 110 of the present disclosure employs a separation description method in which an object to be described is split into several relevant dimensions so as to perform distinguishing descriptions based on several aspects or dimensions and describe an orthogonal relationship of the several dimensions. Because the dimensions used to describe the job in a distinguishing separation manner are orthogonal to each other, the dimensions do not interfere with each other, and no consideration is to be made to the association between dimensions for description of task. As a result, the complexity of program codes running in the data processing system for a heterogeneous architecture according to the present disclosure can be greatly reduced. Further, the intelligence load of the programmers writing these program codes can be relieved obviously. Although FIG. 1 shows the job describing component 110, the object of the present disclosure can still be achieved using an existing job describing component.

Although FIG. 1 illustrates one or more central processing units and at least one coprocessor device end connected with the one or more central processing units for a heterogeneous architecture according to the present disclosure, the system shown in FIG. 1 may further include a gateway component between CPUs and a direct communication component between coprocessors, for example, between GPUs, which is represented by a big circle connecting two GPUs through dotted line, as shown in FIG. 1.

Although the above descriptions of the present disclosure are made based on the structure of the system, a data processing method for a heterogeneous architecture is obviously included according to another aspect of the present disclosure. Firstly, the task topology generating component 120 executes a job decomposition step and a task topology generation step, where the job decomposition step includes decomposing a job to be completed into a series of tasks executed by an actor in the heterogeneous architecture, and the task topology generation step includes generating a task relationship topology based on an inherent relationship between the decomposed tasks during the job decomposition step for performing job decomposition. Afterwards, the actor creating component 130 executes an actor creation step, where the actor creation step includes creating a corresponding actor for each task based on the task relationship topology in a computing resource. Finally, the actor network component 140 executes a task data processing step, where the task data processing step includes fragmenting actual job data into task data when receiving the actual job data, where the task data is continuously input into one or more data processing paths including various created actors so as to complete the processing of the task data.

The basic principle of the present disclosure is described in combination with specific embodiments. It should be pointed out that those skilled in the art may understand that any or all of steps or components of the method and apparatus of the present disclosure may be implemented by hardware, firmware, software or combination thereof in any computing apparatus (including processor, storage medium and the like) or a network of the computing apparatus. The present disclosure can be practiced by those skilled in the art using their basic programming skills after reading the specification of the present disclosure.

Therefore, the object of the present disclosure may also be achieved by running one program or one set of programs on any computing apparatus. The computing apparatus may be a well-known general apparatus. Further, the object of the present disclosure may also be achieved by providing a program product including the program codes for implementing the method or apparatus. In other words, the program product forms a part of the present disclosure and a storage medium storing such program products also form a part of the present disclosure. Apparently, the storage medium may be any well-known storage medium or any storage medium developed in the future.

It should also be pointed out that various components or steps of the apparatus and method of the present disclosure may be decomposed and/or recombined. These decompositions and/or re-combinations should be deemed as equivalent solution of the present disclosure. Furthermore, the above steps may be performed naturally in the described time sequence but does not necessarily require such time sequence, and some steps may be performed in parallel or independently.

The above specific embodiments do not constitute any limitation to the scope of protection of the present disclosure. Those skilled in the art should understand that various modifications, combinations, sub-combinations and substitutions may be made depending on the design requirements and other factors. Any modifications, equivalent substitutions or improvements or the like made within the spirit and principle of the present disclosure shall all fall in the scope of protection of the present disclosure.

What is claimed is:

1. A data processing system for a heterogeneous architecture, comprising:
   a task topology generating component, configured to decompose a to-be-completed job into a series of tasks executed by an actor in the heterogeneous architecture, and generate a task relationship topology based on an inherent relationship between the decomposed tasks during the job decomposition, wherein a task node of the task topology comprises all node attributes required to execute a corresponding task;
   an actor creating component, configured to create a corresponding actor for each task node in a computing resource based on the task relationship topology; and
   an actor network component, configured to comprise one or more data processing paths comprising various created actors, and fragment actual job data into task data when receiving the actual job data, wherein the task data is continuously input into the data processing path so as to complete the processing of the task data.

2. The data processing system of claim 1, further comprising a job describing component, configured to describe a job neural network model and a resource to be applied for by the job based on a job type.

3. The data processing system of claim 2, wherein the job describing component is configured to describe the job from different dimensions which are orthogonal to each other in a mutual distinguishing separation manner.

4. The data processing system of claim 1, wherein the heterogeneous architecture comprises one or more central processing units and at least one coprocessor device end connected with the one or more central processing units.

5. The data processing system of claim 4, wherein the heterogeneous architecture further comprises a gateway connected between a plurality of central processing units.

6. The data processing system of claim 1, wherein the node of the task topology comprises all node attributes required to execute a corresponding task.

7. The data processing system of claim 6, wherein the all node attributes comprise a resource attribute indicating a resource required by a task corresponding to a node and a condition attribute indicating a condition of triggering a task execution.

8. The data processing system of claim 1, wherein the task topology generating component comprises one or combination of a redundant node eliminating unit and a blocked node eliminating unit.

9. The data processing system of claim 1, wherein each of the data processing paths comprises one or more upstream actors and one or more downstream actors, wherein each downstream actor receives processed task data output by the upstream actor.

10. The data processing system of claim 1, wherein the actor comprises a finite state machine and a processing component, and the processing component executes a task designated during creation every time the finite state machine satisfies a predetermined condition.

11. The data processing system of claim 1, wherein the actor comprises a message bin, and receives a message of the upstream or downstream actor through the message bin, so as to obtain task data generated by the upstream actor based on the message from the upstream actor and idle a local memory based on the message from the downstream actor.

12. The data processing system of claim 1, wherein the actor is a movement actor or a computing actor.

13. A data processing method for a heterogeneous architecture, comprising:
 a job decomposition step, in which a to-be-completed job is decomposed into a series of tasks executed by an actor in the heterogeneous architecture;
 a task relationship topology generation step, in which a task relationship topology is generated based on an inherent relationship between the decomposed tasks during the job decomposition performed in the job decomposition step, wherein a task node of the task topology comprises all node attributes required to execute a corresponding task;
 an actor creation step, in which a corresponding actor is created for each task node in a computing resource based on the task relationship topology; and
 a task data processing step, in which actual job data is fragmented into task data when the actual job data is received, wherein the task data is input continuously into one or more data processing paths comprising various created actors so as to complete the processing of the task data.

14. The data processing method of claim 13, further comprising: a job description step, in which before the job decomposition step is performed, a job neural network model, a number of neural network layers, a number of neurons in each neural network layer and a resource set available to the job are described based on a job type.

15. The data processing method of claim 14, wherein in the job description step, the job is described from different dimensions which are orthogonal to each other in a mutual distinguishing separation manner.

16. The data processing method of claim 13, wherein the heterogeneous architecture at least comprises a central processing unit and a coprocessor device end connected with the central processing unit.

17. The data processing method of claim 16, wherein the heterogeneous architecture further comprises a gateway between a plurality of central processing units.

18. The data processing method of claim 13, wherein the task relationship topology generation step comprises assigning all node attributes required to execute a corresponding task to each node.

19. The data processing method of claim 18, wherein the all node attributes comprise a resource attribute indicating a resource required by a task corresponding to a node and a condition attribute indicating a condition of triggering a task execution.

20. The data processing method of claim 13, wherein the task relationship topology generation step comprises a step of eliminating a redundant node or a blocked node during the generation of the task relationship topology.

* * * * *